United States Patent
Kim et al.

(10) Patent No.: US 8,737,918 B2
(45) Date of Patent: May 27, 2014

(54) ROUTING METHOD FOR GUARD LAMP USING SHORT DISTANCE WIRELESS COMMUNICATION

(75) Inventors: Kyu-Hyung Kim, Daegu (KR); Hyun-Woo Kang, Daegu (KR); Joung-Sik Kim, Daegu (KR); Seok-Jin Lee, Daegu (KR); Gwang-Su Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 269 days.

(21) Appl. No.: 12/966,167

(22) Filed: Dec. 13, 2010

(65) Prior Publication Data

US 2011/0151786 A1    Jun. 23, 2011

(30) Foreign Application Priority Data

Dec. 21, 2009    (KR) .................... 10-2009-0128383

(51) Int. Cl.
*H04B 7/00*    (2006.01)
*H04L 12/28*    (2006.01)

(52) U.S. Cl.
USPC .................................. 455/41.2; 370/351

(58) Field of Classification Search
USPC ............... 455/7, 8, 41.1, 41.2, 92, 103, 41.3; 370/351
See application file for complete search history.

(56) References Cited

U.S. PATENT DOCUMENTS

| | | | | |
|---|---|---|---|---|
| 5,555,454 | A  * | 9/1996 | Dees | 340/332 |
| 7,356,329 | B2 * | 4/2008 | Willey et al. | 455/410 |
| 8,036,139 | B2 * | 10/2011 | Kouvelas | 370/254 |
| 8,059,009 | B2 * | 11/2011 | Van Wyk et al. | 340/870.03 |
| 8,160,056 | B2 * | 4/2012 | Van der Merwe et al. | 370/351 |
| 8,265,550 | B2 * | 9/2012 | Aaron | 455/13.1 |
| 2009/0088070 | A1 | 4/2009 | Aaron | |
| 2011/0080267 | A1 * | 4/2011 | Clare et al. | 340/10.4 |

FOREIGN PATENT DOCUMENTS

| KR | 10-0845675 | 7/2008 |
|---|---|---|
| KR | 10-2009-0056109 | 6/2009 |

OTHER PUBLICATIONS

Y.I. Kim et al., "WiBro Mobile Multi-hop Relay Technology", Journal of Korean Institute of Information Scientist and Engineers, 2007, pp. 28-37.

* cited by examiner

*Primary Examiner* — Andrew Wendell
*Assistant Examiner* — Maryam Soltanzadeh
(74) *Attorney, Agent, or Firm* — Staas & Halsey LLP

(57) ABSTRACT

Provided is a routing method for a guard lamp using a short distance wireless communication, the method including: performing, by a neighbor setup guard lamp, a neighbor setup operation; transferring, by the neighbor setup guard lamp, an initialization request message (Init_Request Message) to a neighbor guard lamp and receiving an initialization response message (Init-Rep Message) from the neighbor guard lamp to form a guard lamp network; receiving, by the neighbor setup guard lamp, a data message from the neighbor guard lamp; and repairing a path of the neighbor guard lamp having an error caused by a link loss at the receiving of the data message.

7 Claims, 10 Drawing Sheets

○ : GUARD LAMP

FIG. 6
(a)
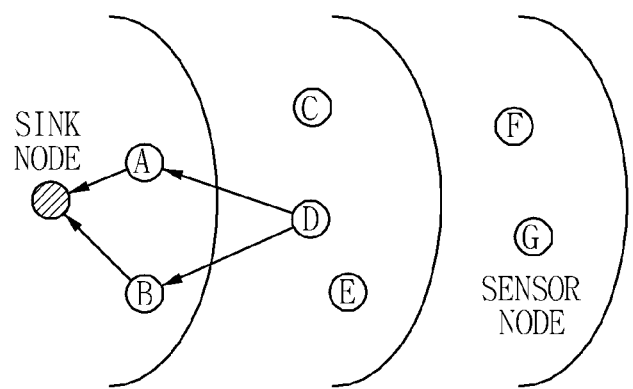
(b)
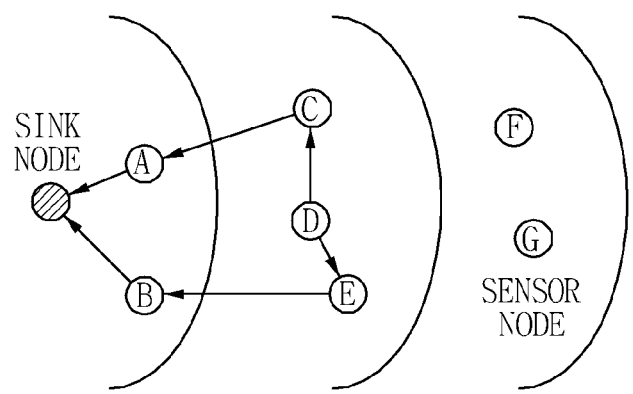

NODE D: DETOUR STATE

NODE D: DETOUR STATE

ROUTING METHOD FOR GUARD LAMP USING SHORT DISTANCE WIRELESS COMMUNICATION

CROSS REFERENCE TO RELATED APPLICATIONS

This application claims priority to Korean Patent Application No. 10-2009-0128383 filed on Dec. 21, 2009, the entire contents of which are herein incorporated by reference.

BACKGROUND OF THE INVENTION

1. Field of the Invention

The present invention relates to a routing method for a guard lamp using a short distance wireless communication, and more particularly, to a short distance wireless communication routing method required when a short distance wireless communication technology is applied to a guard lamp separately installed and operated in a narrow alley or a crime district.

2. Description of the Related Art

Guard lamps, which are generally installed in a narrow alley, a crime district, or a residential zone, are separately installed and operated.

Further, mutual communication between the guard lamps is carried out by using a wireless communication technology. However, there is no short distance wireless routing communication method specialized for the guard lamps.

In addition, since the guard lamps are often additionally installed or removed by the request from users (local residents), the simplest communication structure (start topology) is generally used in limited space.

Since an automatic switch for the guard lamp is installed in an outdoor environment, link characteristics vary due to the surrounding environment, season, and the like. When a path is broken by a link loss, the path should be repaired and reset. Further, the nodes of a guard lamp network are installed, moved, and uninstalled by the request from residents. The automatic switch for the guard lamp which is once installed is maintained and used at a fixed location for a ling time.

Accordingly, it is important to form a reliable link at the time of setting up an initial network topology (communication link). Further, a plurality of automatic guard lamp switches can request information setup at the same time according to the characteristics of the guard lamps, while the plurality of automatic guard lamp switches do not simultaneously send information. However, the automatic guard lamp switches can respond to many setups at the same time.

FIG. 1 shows an example in which guard lamps are separately installed in actuality.

As shown in FIG. 1, since the guard lamps are installed in a residential zone, the guard lamps are easily covered by a building and routing optimized for the guard lamp is required for two-way communication.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a wireless communication routing method capable of enhancing a guard lamp.

Further, the present invention has been made in an effort to provide a wireless communication routing method capable of performing routing in a remote guard lamp repeater with respect to a guard lamp switch.

An exemplary embodiment of the present invention provides a routing method for a guard lamp using a short distance wireless communication, the method including: performing, by a neighbor setup guard lamp, a neighbor setup operation; transferring, by the neighbor setup guard lamp, an initialization request message (Init_Request Message) to a neighbor guard lamp and receiving an initialization response message (Init-Rep Message) from the neighbor guard lamp to form a guard lamp network; receiving, by the neighbor setup guard lamp, a data message from the neighbor guard lamp; and repairing a path of the neighbor guard lamp having an error due to a link loss at the receiving of the data message.

In particular, the performing of the neighbor setup operation may include: broadcasting, by the neighbor setup guard lamp, a neighbor solicitation message to the neighbor guard lamp; transferring a neighbor join message indicating that the neighbor guard lamp joins a neighbor node to the neighbor setup guard lamp; and performing an acknowledgment for forming an interactive wireless communication link with respect to the neighbor join message in the neighbor setup guard lamp.

Further, in the case where a new neighbor guard lamp is added to the guard lamp network when the new neighbor guard lamp does not receive the initialization solicitation message from the neighbor setup guard lamp within a predetermined time, the new neighbor guard lamp may join the guard lamp network after performing the neighbor setup operation.

The neighbor setup guard lamp may set up an uplink path by performing the neighbor setup operation and set up a downlink path by receiving the initialization response message from the neighbor guard lamp.

The forming of the guard lamp network may include: performing initialization and the neighbor setup operation with the neighbor guard lamp by receiving the initialization solicitation message from a neighbor guard lamp which is positioned within one hop; and notifying the result of performing the initialization and the neighbor setup operation with the neighbor guard lamp to the neighbor setup guard lamp through the initialization response message.

At the repairing of the path of the neighbor guard lamp, the path of the neighbor guard lamp may be repaired by referring to a status value of a neighbor table acquired by performing the neighbor setup operation.

The status value of the neighbor table may be referred by detouring to a neighbor guard lamp which is positioned in the same hop.

At the repairing of the path of the neighbor guard lamp, in the case where an uplink path of a predetermined neighbor guard lamp is broken, a message indicating that an uplink path of the corresponding neighbor guard lamp is broken may be broadcasted to the neighbor guard lamp.

At the repairing of the path of the neighbor guard lamp, when all neighbor guard lamps having the same hop number are in a detour state, it may be regarded that the guard lamp network is broken and formation of the detour path may not be attempted.

When a downlink path formed at the forming of the guard lamp network is lost, the downlink path may be newly set up through exchange of RREQ and RREP messages.

According to exemplary embodiments of the present invention, a routing method for a guard lamp using a short distance wireless communication can provide the following effects.

First, a simple communication structure can be provided in guard lamps which are separately installed and operated and in limited space.

Second, guard lamps which are installed in a narrow alley or a crime district can be enhanced.

Third, a reliable link can be formed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 6 is a diagram illustrating detour path set-up by applying the short distance wireless communication routing method according to an exemplary embodiment of the present invention;

Figure 1:
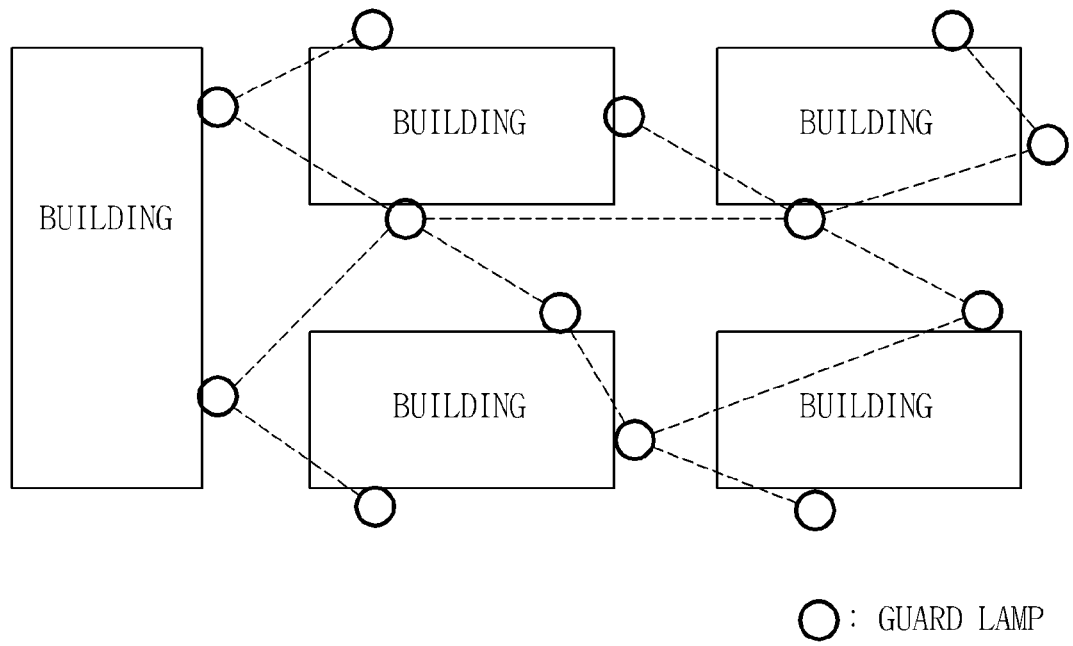
FIG. 1 is a diagram illustrating an example in which guard lamps are separately installed.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

The present invention will be described below with reference to the accompanying drawings. Herein, the detailed description of a known function and configuration that may make the purpose of the present invention unnecessarily ambiguous in describing the spirit of the present invention will be omitted. Exemplary embodiments of the present invention are provided so that those skilled in the art may more completely understand the present invention. Accordingly, the shape, the size, etc., of elements in the figures may be exaggerated for explicit comprehension.

Exemplary embodiments of the structure and application scheme of the present invention will be described in detail with reference to the accompanying drawings. A short distance wireless communication routing method according to an exemplary embodiment of the present invention can be applied to a lighting lamp such as a street lamp in addition to a guard lamp.

Figure 2:
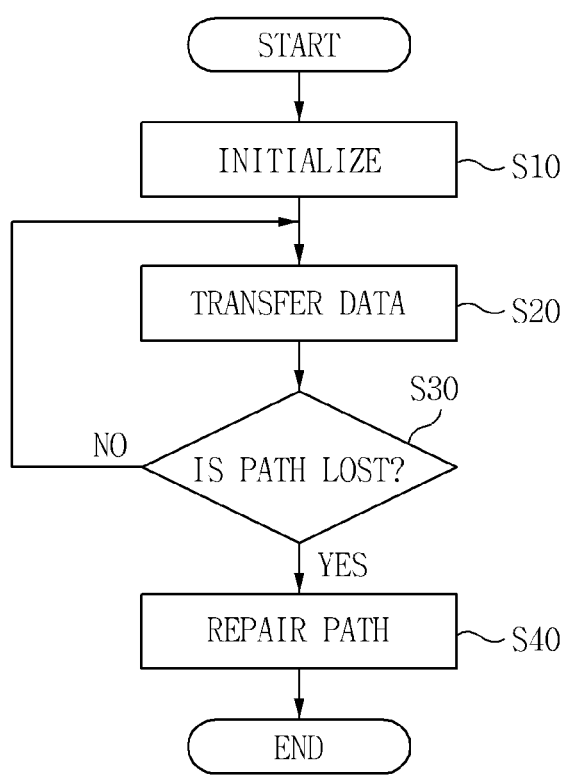
FIG. 2 is a flowchart illustrating a progression process of a short distance wireless communication routing method according to an exemplary embodiment of the present invention.

A short distance wireless communication routing method for an intelligent guard lamp network may generally include an initializing step of forming a topology (S10), transferring data (S20), checking a path loss (S30), and repairing the lost path (S40) as shown in FIG. 2.

The short distance wireless communication may be one of known schemes as a Near Field Communication.

Figure 3:
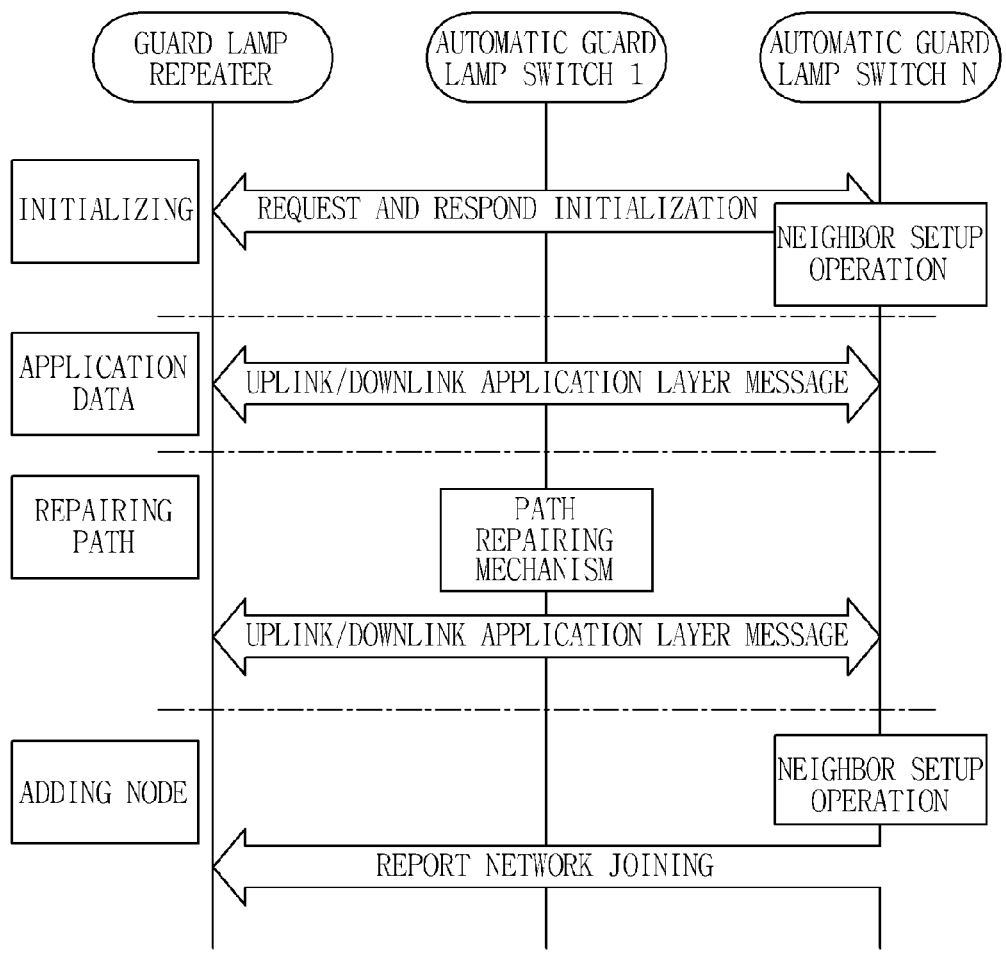
FIG. 3 is a signal flowchart illustrating an outline of short distance wireless communication routing method according to an exemplary embodiment of the present invention.

FIG. 3 is a signal flowchart illustrating an outline of short distance wireless communication routing according to an exemplary embodiment of the present invention.

Referring to FIG. 3, at an initialization requesting and responding step, a more robust wireless link is set up between a guard lamp repeater and each automatic guard lamp switch through a neighbor setup operation and when a path is broken, the path is repaired by using a path repairing mechanism.

Further, when the automatic guard lamp switch is added, a guard lamp joins the guard lamp network after it performs the neighbor setup operation.

Figure 4:
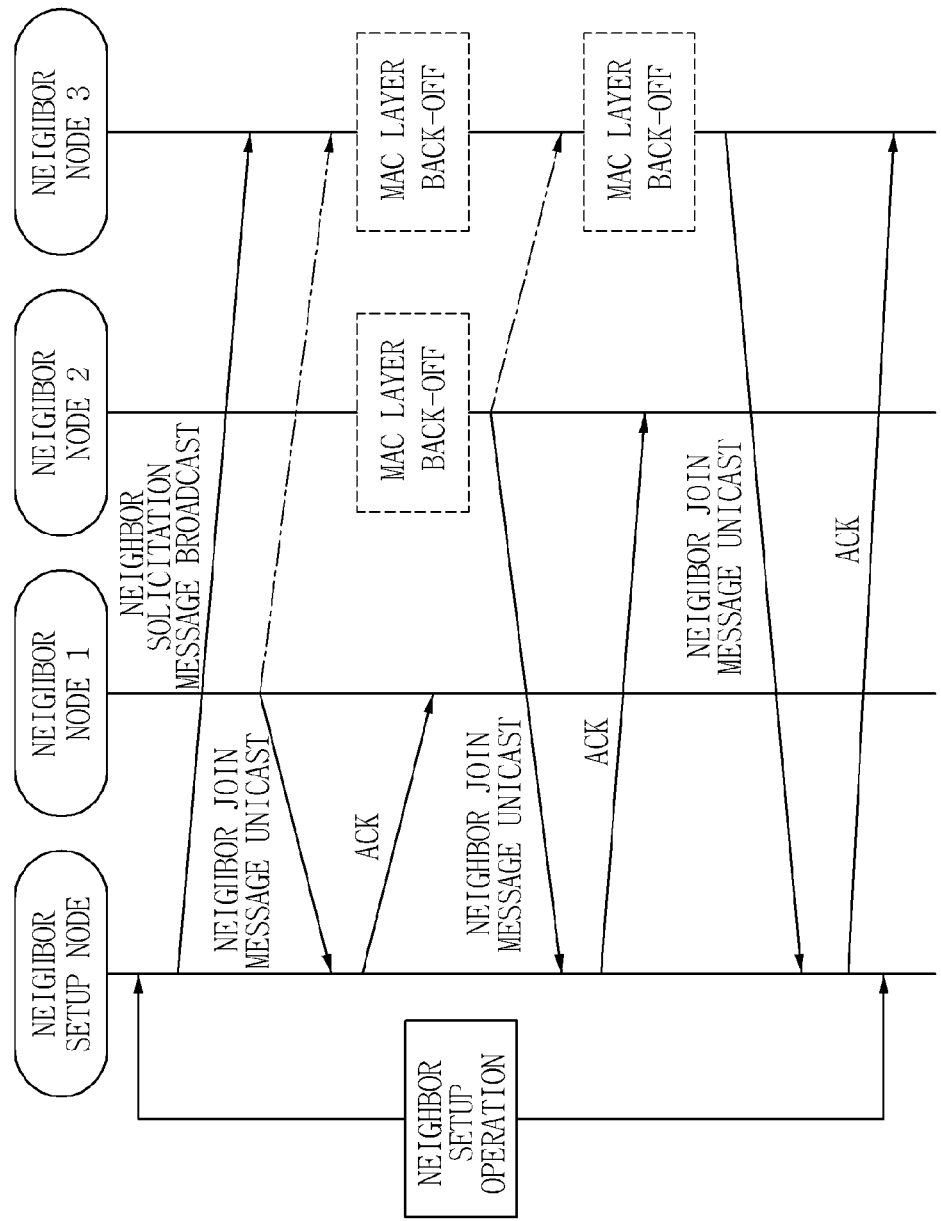
FIG. 4 is a diagram illustrating a neighbor setup operation process by applying a short distance wireless communication routing method according to an exemplary embodiment of the present invention.

FIG. 4 is a diagram illustrating a neighbor setup operation process by applying a short distance wireless communication routing method according to an exemplary embodiment of the present invention.

Referring to FIG. 4, the automatic guard lamp switch which starts the neighbor setup operation is referred to as a neighbor setup node and another automatic guard lamp switch which positioned adjacent to the neighbor setup node (within an RF communication reaching distance) is referred to as a neighbor node.

First, the neighbor setup node broadcasts a neighbor solicitation message in order to set up a neighbor.

Neighbor node 1 which is positioned adjacent to the neighbor setup node transmits a neighbor join message indicating that it joins the neighbor node to the neighbor setup node.

Further, the neighbor setup node completes set-up of one adjacent neighbor node by performing an acknowledgment in order to form an interactive wireless communication link.

This process is continued until all adjacent neighbor nodes (Neighbor node 2 and Neighbor node 3) join in the neighbor node. When the neighbor node setup for the neighbor setup node is completed, Neighbor node 1 or other neighbor nodes becomes the neighbor setup node to retrieve the adjacent neighbor nodes and perform the neighbor node setup.

Figure 5:
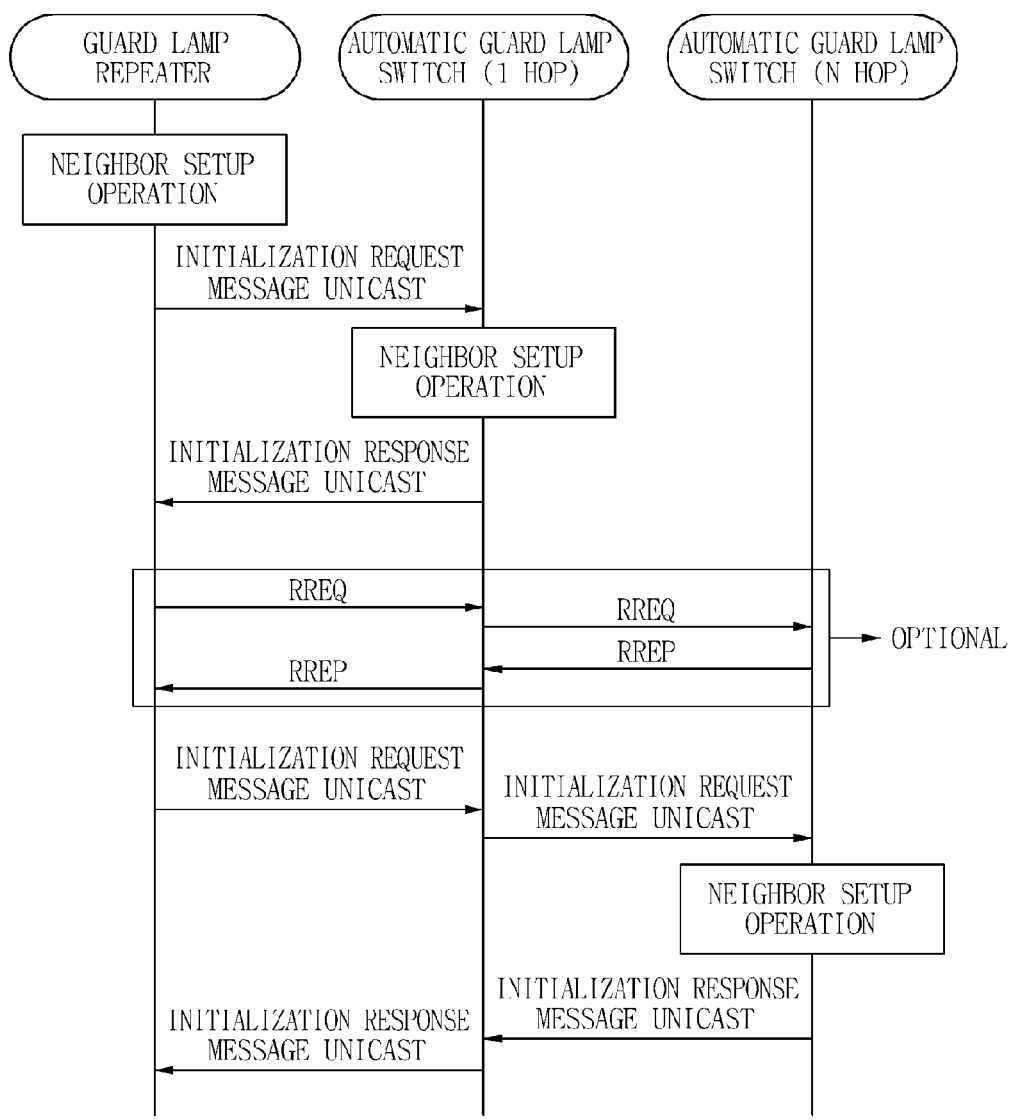
FIG. 5 is a diagram illustrating a network initialization process associated with a neighbor setup operation.

FIG. 5 is a diagram illustrating a network initialization process associated with a neighbor setup operation.

Referring to FIG. 5, the guard lamp repeater first performs the neighbor setup operation.

Subsequently, initialization with the neighbor node positioned in an adjacent 1 hop and the neighbor setup operation are performed in the neighbor node and thereafter, the result is notified to the guard lamp repeater.

A node which receives an initialization request message (Init_Request message) performs the neighbor setup operation to form links with neighbor nodes and reports the result to a sink node through an initialization response message (Init_Rep Message).

A node which finishes initialization recognizes IDs and the number of hops of adjacent neighbor nodes and the number of hops of the corresponding hop. When the initialization process ends, both uplink and downlink paths can be recognized.

A neighbor table may be formed through the neighbor setup operation as shown in Table 1 and each node may have any one of three (normal, detour, and unreachable) statuses.

TABLE 1

| Node ID | Hop Count | Status |
| --- | --- | --- |
| Node #1 | 1 | Normal |
| Node #2 | 2 | Detour |
| Node #3 | 2 | Unreachable |
| ... | ... | ... |

FIG. 6 is a diagram illustrating a detour path set-up by applying a short distance wireless communication routing method according to an exemplary embodiment of the present invention.

Referring to FIG. 6, in order to prevent a problem in a routing loop which may occur at the time of setting up the detour path, the routing loop is prevented by referring to a status value in the neighbor table.

As shown in FIGS. 6A and 6B, the node D should notify all of its uplink path links are broken to the adjacent neighbor nodes by setting up the detour path and broadcasting a detour state advertise message. Neighbor nodes C and E which receive the detour state advertise message update status information of the neighbor table to display that the corresponding node is subjected to a path repairing process.

Each of the nodes C and E do not transfer data to the neighbor node D which is in a detour setup state to prevent the routing loop.

Figure 7:
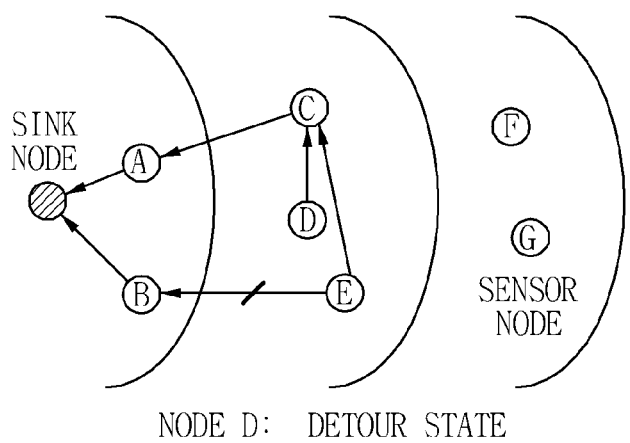
FIG. 7 is a diagram illustrating routing loop prevention by applying the short distance wireless communication routing method according to an exemplary embodiment of the present invention.

FIG. 7 is a diagram illustrating routing loop prevention by applying a short distance wireless communication routing method according to an exemplary embodiment of the present invention.

Referring to FIG. 7, when all the uplink paths of the node E are broken, since the node E recognizes that the node D is in a detour state, the detour path is formed through the node C which is another neighbor node. In this case, the node E also notifies that its all uplinks are broken through the detour state advertise message and the node D stops transferring data to the node E and selects another path. When all neighbor nodes having the same hop number are in the detour state, it is regarded that the network is broken and formation of the detour path is not attempted.

Figure 8:
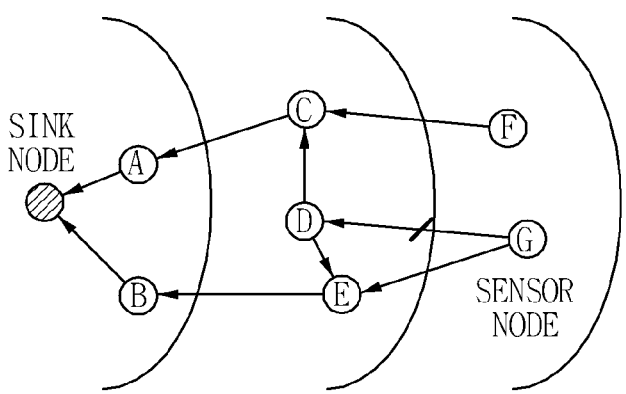
FIG. 8 is a diagram illustrating an operation in a node having a node which is in a detour state as an uplink in applying the short distance wireless communication routing method according to an exemplary embodiment of the present invention.

FIG. 8 is a diagram illustrating the operation in a node having a node which is in a detour state as an uplink in applying the short distance wireless communication routing method according to an exemplary embodiment of the present invention.

Referring to FIG. 8, when the node D is in the detour state and the detour path is set up, a node G which receives the detour state advertise message of the node D transfers data through the node E which is another uplink.

The detour state advertise message is broadcasted by the node E which is transitioned to the detour state and not transferred to nodes of 2 hops or more.

Figure 9:
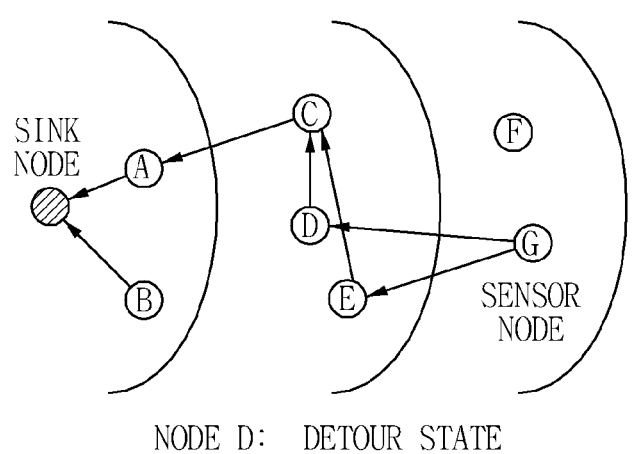
FIG. 9 is a diagram illustrating an operation when all uplinks are in a detour state in applying the short distance wireless communication routing method according to an exemplary embodiment of the present invention.

FIG. 9 is a diagram illustrating the operation when all uplinks are in a detour state in applying the short distance wireless communication routing method according to an exemplary embodiment of the present invention.

Referring to FIG. 9, other selection cannot be made when all neighbor nodes of the uplink are in the detour state.

Therefore, data is transferred to the nodes which are in the detour state. Both the nodes D and E are in the detour state and the node G uses the nodes D and E as the uplink. Although the nodes of the uplink are in the detour state, since the nodes are not in a state in which the path is broken, the node G transfers data to the node D or the node E. The node G does not set up a detour path to the node F which is a node having the same hop and the state value is maintained to normal.

Figure 10:
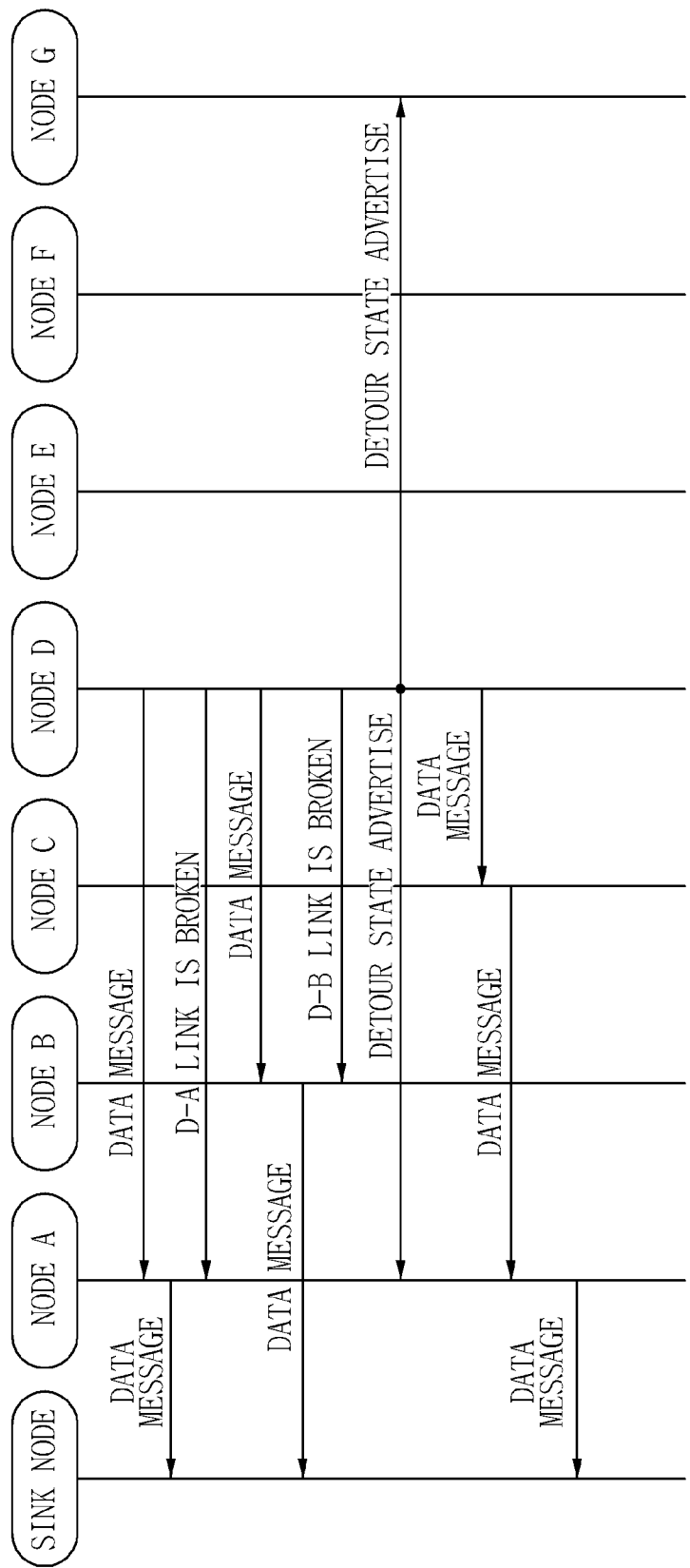
FIG. 10 is a diagram illustrating the flow of a message during a path repairing process.

FIG. 10 is a diagram illustrating the flow of a message during a path repairing process.

Referring to FIG. 10, when a data message is transferred from the node D to the node A, the node A transfers the transferred data message to the sink node. If a link between the node D and the node A is broken, when the data message is transmitted from the node D to the node B, the node B transfers the data message to the sink node.

If a link between the node D and the node B is broken, the detour state advertise message is broadcasted to the neighbor nodes.

Subsequently, when the data message is transferred from the node D to the node C through detouring, the node C transfers the data message to the sink node.

Figure 11:
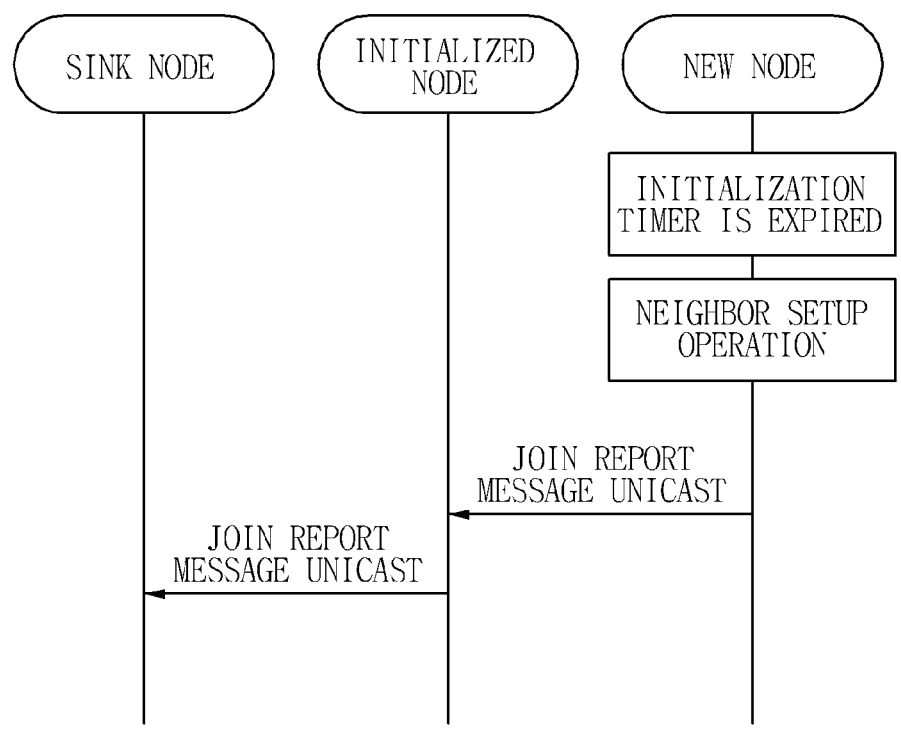
FIG. 11 is a diagram illustrating an operation method by adding a switch in applying a short distance wireless communication routing method according to an exemplary embodiment of the present invention.

FIG. 11 is a diagram illustrating an operation method by adding a switch in applying a short distance wireless communication routing method according to an exemplary embodiment of the present invention.

Referring to FIG. 11, when a new node is added to a guard lamp network, the added node joins the network.

The newly added node has an initialization standby timer. When the initialization request message is not received from the sink node within a timer time, the neighbor setup operation is performed. Information of the adjacent neighbor nodes is received and the result is reported to the sink node through a join report message.

When the sink node intends to send a message to the newly added node, a downlink link is not yet set up. Therefore, path setup is attempted through RREQ/RREP exchange.

According to exemplary embodiments of the present invention, a simple communication structure can be provided in guard lamps which are separately installed and operated and in limited space. Further, guard lamps which are installed in a narrow alley or a crime district can be enhanced and a reliable link can be formed.

Some steps of the present invention can be implemented as a computer-readable code in a computer-readable recording medium. The computer-readable recording media includes all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, a magneto-optical storage device, etc., and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A routing method of a guard lamp, comprising:

performing, by a neighbor setup guard lamp, a neighbor setup operation using a short distance wireless communication to form a guard lamp network using a communication link;

transferring, by the neighbor setup guard lamp, an initialization request message (Init_Request Message) to a neighbor guard lamp and receiving an initialization response message (Init-Rep Message) from the neighbor guard lamp, the neighbor guard lamp newly joining the guard lamp network subsequent to the neighbor setup operation;

receiving, by the neighbor setup guard lamp, a data message from the neighbor guard lamp; and repairing and resetting a path of the neighbor guard lamp, the path having an error caused by a link loss at the receiving of the data message, and wherein the repairing of the path of the neighbor guard lamp implemented corresponds with a status value of a neighbor table acquired at the neighbor setup operation, and the repairing includes:

setting a detour path formed through one or more uplink paths which are in normal states when the neighbor setup guard lamp is in a normal state, setting the detour path formed through the one or more uplink paths when all uplink paths are in detour states, and setting a detour path formed through one or more neighbor guard lamps positioned within the same hop when the neighbor setup guard lamp that set the neighbor setup operation among the neighbor guard lamps is in a detour state, and wherein the guard lamp network is formed by:

performing initialization and the neighbor setup operation with the neighbor guard lamp by receiving the initialization solicitation message from the neighbor guard lamp which is positioned within one hop; and notifying a result of performing the initialization and the neighbor setup operation with the neighbor guard lamp to the neighbor setup guard lamp through the initialization response message, and wherein the neighbor setup guard lamp sets up an uplink path by performing the neighbor setup operation and sets up a downlink path by receiving the initialization response message from the neighbor guard lamp.

2. The method of claim 1, wherein the performing the neighbor setup operation includes:

broadcasting a neighbor solicitation message from the neighbor setup guard lamp to the neighbor guard lamp;

transferring a neighbor join message from the neighbor guard lamp to the neighbor setup guard lamp; and performing an acknowledgment for forming an interactive wireless communication link with respect to the neighbor join message in the neighbor setup guard lamp.

3. The method of claim 1, further comprising:

performing the neighboring setup operation to join the guard lamp network by a new neighbor guard lamp when the new neighbor guard lamp does not receive the initialization solicitation message from the neighbor setup guard lamp within a predetermined time in the case where the new neighbor guard lamp is added to the guard lamp network.

4. The method of claim 1, wherein the status value of the neighbor table is referred when detouring to another neighbor guard lamp which is positioned in the same hop as the neighbor guard lamp is occur.

5. The method of claim 1, wherein the repairing the path of the neighbor guard lamp broadcasts a message indicating that an uplink path of the corresponding neighbor guard lamp is broken to the neighbor guard lamp in the case where the uplink path is broken.

6. The method of claim 1, wherein the repairing the path of the neighbor guard lamp regards the guard lamp network as a broken network and does not attempt forming the detour path when all neighbor guard lamps having the same hop number are in a detour state.

7. The method of claim 1, wherein the downlink path is newly set up through exchange of the initialization request message and the initialization response message when the downlink path is lost.

* * * * *